(12) United States Patent  
Kumamoto et al.

(10) Patent No.: US 7,051,615 B2  
(45) Date of Patent: May 30, 2006

(54) ACCELERATOR PEDAL DEVICE

(75) Inventors: Masato Kumamoto, Odawara (JP); Takumi Oikawa, Odawara (JP); Tsuyoshi Hosono, Odawara (JP)

(73) Assignee: Mikuni Corporation, Tokyo (JP)

( * ) Notice: Subject to any disclaimer, the term of this patent is extended or adjusted under 35 U.S.C. 154(b) by 174 days.

(21) Appl. No.: 10/398,164

(22) PCT Filed: Sep. 28, 2001

(86) PCT No.: PCT/JP01/08630

§ 371 (c)(1),  
(2), (4) Date: Apr. 2, 2003

(87) PCT Pub. No.: WO02/30699

PCT Pub. Date: Apr. 18, 2002

(65) Prior Publication Data

US 2004/0011155 A1 Jan. 22, 2004

(30) Foreign Application Priority Data

Oct. 10, 2000 (JP) .............................. 2000-308570

(51) Int. Cl.  
*G05G 1/14* (2006.01)

(52) U.S. Cl. ........................ 74/513; 74/512; 123/359; 123/396

(58) Field of Classification Search ................. 74/512, 74/513, 514, 560; 123/396, 399, 359; 188/83; 180/335

See application file for complete search history.

(56) References Cited

U.S. PATENT DOCUMENTS

| | | | | |
|---|---|---|---|---|
| 4,112,885 A | * | 9/1978 | Iwata et al. | 123/359 |
| 5,263,448 A | * | 11/1993 | Bluhm et al. | 123/396 |
| 6,019,016 A | * | 2/2000 | Takagi et al. | 74/513 |
| 6,745,642 B1 | * | 6/2004 | Kumamoto et al. | 74/512 |
| 2003/0047023 A1 | * | 3/2003 | Huesges et al. | 74/514 |
| 2004/0149260 A1 | * | 8/2004 | Watanabe | 123/396 |

FOREIGN PATENT DOCUMENTS

| | | | | |
|---|---|---|---|---|
| EP | 0 336 340 | * | 10/1989 | 123/396 |
| JP | 11-151948 | | 6/1999 | 74/513 |
| JP | 11-182268 | | 7/1999 | 74/513 |

* cited by examiner

*Primary Examiner*—Vinh T. Luong  
(74) *Attorney, Agent, or Firm*—Wenderoth, Lind & Ponack, L.L.P.

(57) ABSTRACT

The present apparatus includes an accelerator pedal 10, a pedal arm 20, a pedal shaft 30 which supports the pedal arm 20 so as to be free to swing, a return spring 40, a friction generating mechanism 50 which generates friction force corresponding to a position of the pedal arm 20, an accelerator position sensor 60 and a control segment 70 which controls an opening of a throttle valve 110 based on an output signal of the sensor 60. A play range in which a friction force equal to or larger than a specific level is not generated is set to the friction generating mechanism in the range where the pedal arm moves from a resting position by a specific amount. In the play range, an output signal of the accelerator position sensor 60 is kept constant so that the throttle valve is kept at a specific opening. In this manner, a desirable operating feeling without an unsuitable feeling with the accelerator pedal operation is obtained, and the accelerator apparatus is compact.

17 Claims, 8 Drawing Sheets

(a)

(b)

ACCELERATOR PEDAL DEVICE

TECHNICAL FIELD

The present invention relates to an accelerator pedal apparatus which can be utilized for a vehicle with a drive-by-wire system, and especially relates to an accelerator pedal apparatus having a sensor to detect an amount which accelerator pedal has been depressed.

BACKGROUND ART

An electronic controlled throttle system, namely, a drive by wire system is well-known as a system to control a combustion state, power, revolution, etc. of an engine mounted to a vehicle such as an automobile more accurately and precisely than a driver intends to control the accelerator. With this electronic controlled throttle system (the drive-by-wire system), an accelerator pedal and a throttle valve are not connected by an accelerator cable. The engine power is controlled based on electronic signals converted from the depressing amount of the accelerator pedal.

As shown in FIG. 6, which is a graph illustrating the operation of a conventional accelerator pedal apparatus utilized for this system, depressing force and sensor output increase linearly from a resting position to a maximum depressing position. Consequently, there is no play at the beginning of depressing the accelerator pedal with this structure.

Here, without any play in the operation of the accelerator pedal, a vehicle with an automatic transmission, for example, might start abruptly if the throttle valve opens when the driver puts his foot on the accelerator pedal unconsciously without any intention of depressing the pedal. Accordingly, to prevent this phenomenon, the driver needs extra care for the accelerator operation, which causes an unsuitable feeling during the operation of the accelerator pedal in comparison with the conventional accelerator pedal apparatus.

The present invention is devised in light of the above-mentioned viewpoints, and the purpose is to provide an accelerator pedal apparatus which is easy to operate and causes no unsuitable feeling during the accelerator pedal operation, with the structure being simple, compact and so on.

SUMMARY OF THE INVENTION

The accelerator pedal apparatus of the present invention comprises a pedal arm which is supported so as to be able to move from a resting position to a maximum depressing position by a depressing force transmitted from an accelerator pedal, a return spring which urges the pedal arm to return toward the resting position, a friction force generating mechanism which generates "friction" (i.e., opposing) force corresponding to the position of the pedal arm against the pedal arm, and a detecting device which detects the depressing amount of the accelerator pedal. A play range in which a friction force equal to or larger than a specific level is not generated is set in the range where the pedal arm moves from the resting position by a specific amount, and an opening of a throttle valve is kept constant in the play range by a control means to control the opening of the throttle valve disposed at an intake system of an engine based on an output signal of the detecting means.

With this structure, when the accelerator pedal is depressed, the pedal arm first moves in the specific play range following the depression. Then when it moves further in excess of the play range, a friction force equal to or larger than a specific level is generated in accordance with the movement. Here, the throttle valve is kept at a specific opening while the accelerator pedal is in the play range of the pedal arm by the signal of the control means. During movement beyond the play range, the throttle valve is controlled appropriately to be opened in accordance with the depressing amount of the accelerator pedal. In this manner, a desirable operating feeling without an unsuitable feeling during the accelerator pedal operation is obtained while the structure is being simplified.

Furthermore, the accelerator pedal apparatus of the present invention comprises a pedal arm which is supported movably from a resting position to a maximum depressing position by a depressing force transmitted from an accelerator pedal, a return spring which urges the pedal arm to return toward the resting position, a friction generating mechanism which generates friction force in accordance with the movement of the pedal arm, and a detecting device which detects the depressing amount of the accelerator pedal. A play range in which friction force equal to or larger than a specific level is not generated is set to correspond to a range in which the pedal arm moves from the resting position a specific amount, and an output signal of the detecting means is kept constant in the play range.

With this structure, when the accelerator pedal is depressed, the pedal arm first moves through the specific play range following the depression. Then when it moves further in excess of (beyond) the play range, a friction force equal to or larger than a specific level is generated in accordance with the movement. Here, in the play range of the pedal arm (the accelerator pedal), the signal of the control means is kept constant, resulting in that the throttle valve is kept at a specific opening. In the range over (beyond) the play range, the signal of the control means increases in accordance with the depressing amount of the accelerator pedal, and then the throttle valve is controlled appropriately to be opened in accordance with the change. In this manner, a desirable operating feeling without an unsuitable feeling during the accelerator pedal operation is obtained while the structure is being simplified.

DETAILED DESCRIPTION OF THE INVENTION

An embodiment of the present invention is explained with reference to the attached drawings.

Figure 1:
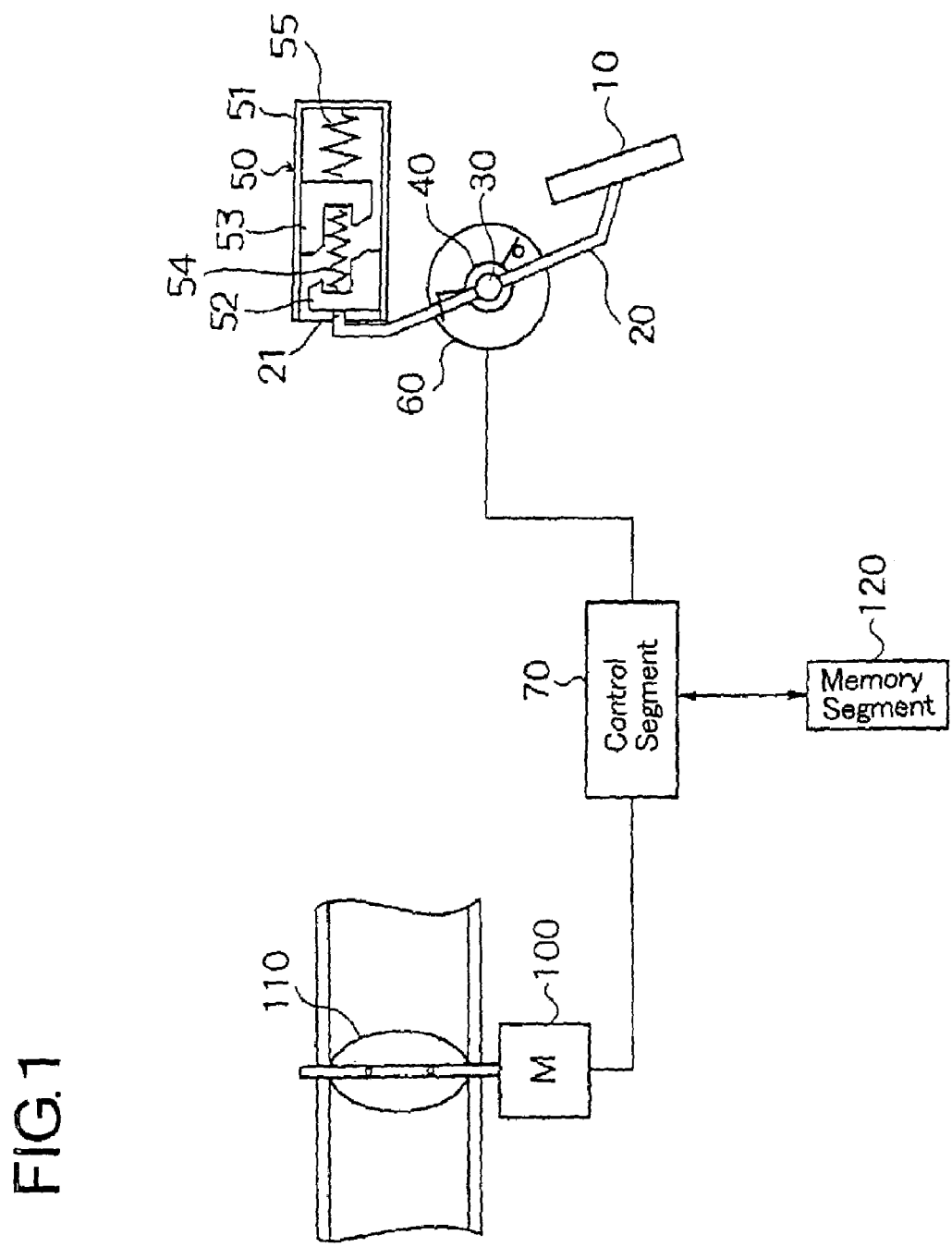
FIG. 1 is a schematic diagram of an accelerator pedal apparatus of the present invention.

As shown in FIG. 1, the accelerator pedal apparatus of the embodiment comprises a pedal arm 20 which is movable from a resting position to a maximum depressing position by a depressing force transmitted from an accelerator pedal 10, a pedal shaft 30 which supports the pedal arm 20 so that the pedal arm 20 is free to swing, an arm return spring 40 which urges the pedal arm 20 to return toward the resting position, a friction force generating mechanism 50 which generates "friction" (i.e., opposing) force corresponding to the position of the pedal arm 20, an accelerator position sensor 60 which serves as a detecting device to detect the depressing amount of the accelerator pedal 10.

Then, a control device (a control segment) 70 drives a motor 100 appropriately based on the accelerator position sensor 60 output signals, so that the opening of a throttle valve 110, which is disposed at an engine intake system, is controlled.

As shown in FIG. 1, a friction force generating mechanism 50 comprises a first movable friction member 52 and a second movable friction member 53 disposed in a sliding guide member 51, and the friction members 52, 53 have inclined surfaces respectively that faces each other. A play load spring 54 is disposed between the first movable friction member 52 and the second movable friction member 53, and a friction member return spring 55 is provided to push back the second movable friction member 53 to a resting position.

Here, it is designed so that the urging force of the return spring 55 at a full-extended state is larger than that of the play load spring 54 at a full-pressed state.

Figure 7A:
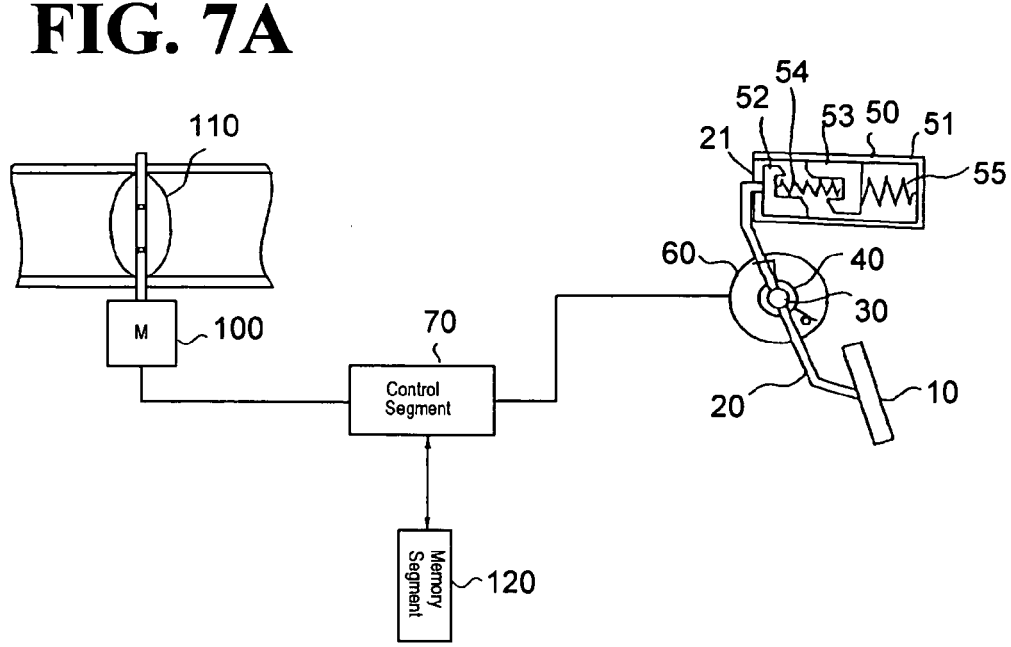
FIGS. 7(A) and 7(B) are schematic diagrams similar to FIG. 1, but illustrating a pedal resting position and a pedal maximum depressing position, respectively.
Figure 7B:
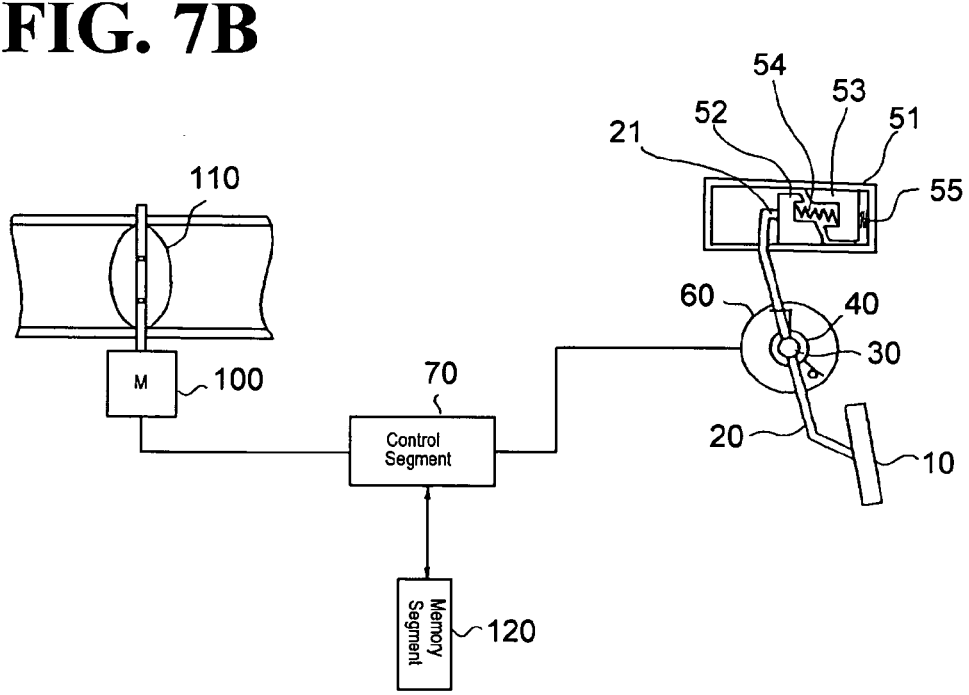

As shown in FIG. 7A, the apparatus starts in the resting position. When the accelerator pedal 10 is depressed by force "F", the pedal arm 20 rotates. Then the end portion 21 of the pedal arm 20 pushes the first movable friction member 52, to cause it to contact the second movable friction member 53 while compressing the play load spring 54. When the accelerator pedal 10 is depressed further, the first movable friction member 52 and the second movable friction member 53 move integrally while compressing the return spring 55. With this movement, the first movable friction member 52 and the second movable friction member 53 push each other with the inclined surface respectively causing a wedge effect. The component of the force F pushes the first movable friction member 52 and the second movable friction member 53 against the inside surface of the sliding guide member 51, so that "friction" (opposing) force is generated in proportion to the pushing force until the apparatus achieves the maximum depressing position shown in FIG. 7B.

Figure 2:
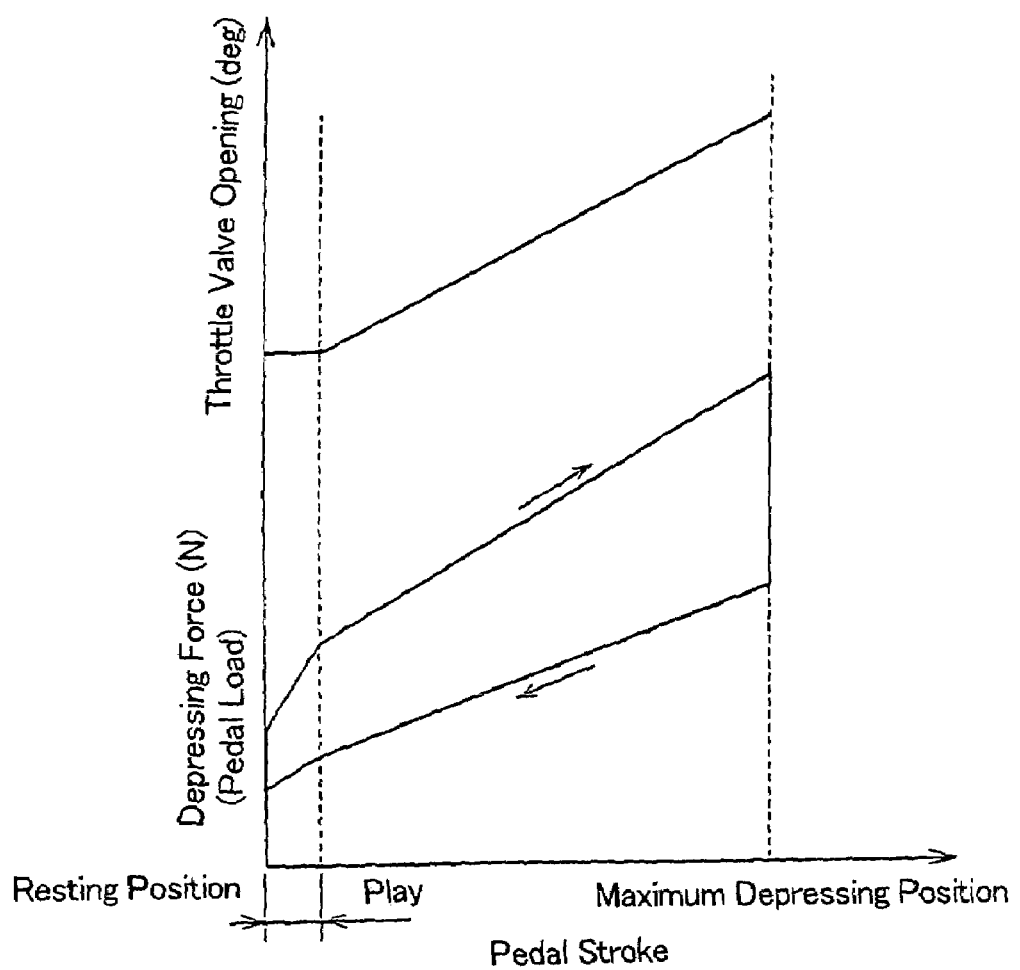
FIG. 2 shows depressing force characteristics and throttle valve opening characteristics of the accelerator pedal of the present invention.

Consequently, in the beginning range of the depressing operation, while the play load spring 54 is compressed until the first movable friction member 52 has contact with the second movable friction member 53, the generation of the friction force is minimized (to or below a specific level). On the whole, the depressing force characteristics are as shown in FIG. 2.

The control segment (the control device) 70 consists of a control unit in which a CPU is integrated. It controls the throttle valve 110 so that the valve is positioned at the desired opening, by calculating variously based on programs or data maps stored in a memory segment (storage) 120, and by transmitting appropriate control signals to the motor 100, after receiving signals of the accelerator position sensor 60, and signals of various sensors to detect engine operating state.

Figure 3:
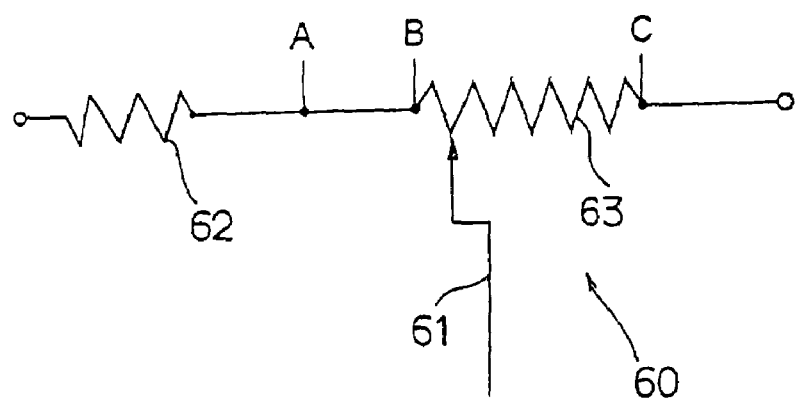
FIGS. 3(A) and (B) are basic circuit diagrams of an accelerator position sensor.
Figure 3:
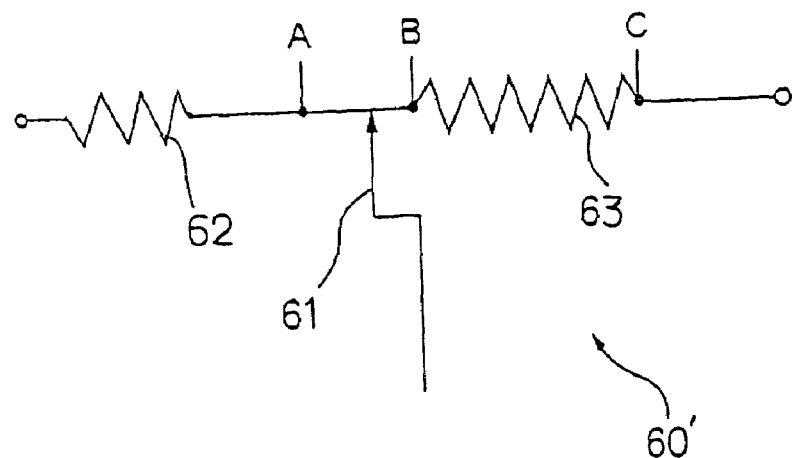

As shown in FIG. 3, the accelerator position sensor (detecting device) 60 is a contact type position sensor with a variable resistor. A slider 61 moves between points B and C where a resistor 63 exists, as shown in FIG. 3(a). The range between B and C corresponds to the movable range of the accelerator pedal 10 (the pedal arm 20), which is between a resting position and a maximum depressing position. In other words, the space between points B and C corresponds to all of the play range and the friction generating range. For example, point B corresponds to a resting position and point C corresponds to a maximum depressing position.

Figure 4:
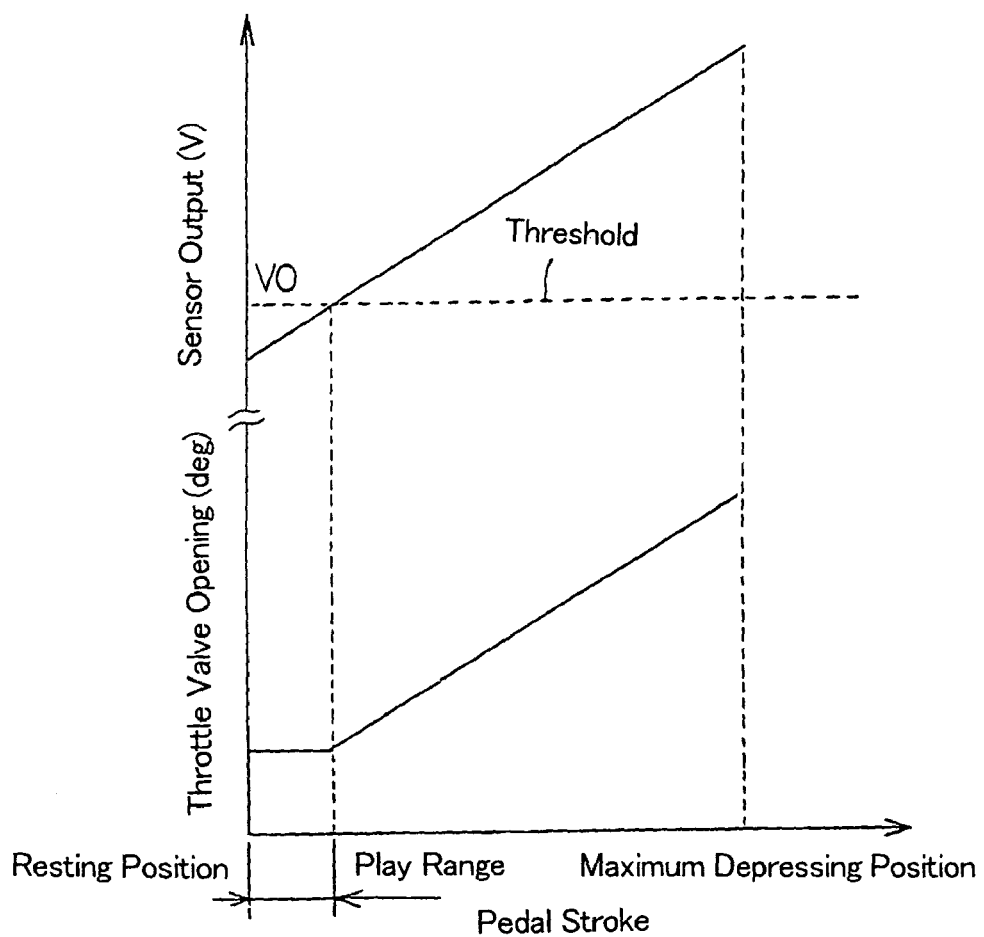
FIG. 4 shows output characteristics of the sensor corresponding to FIG. 2 (*a*).

Therefore, the output signal increases linearly upward slant to the right in accordance with the depressing amount (pedal stroke) of the accelerator pedal 10, as shown in FIG. 4. Here, a threshold V0 of the sensor output is set to the memory segment 120 in advance, so that the control segment 70 controls the throttle valve 110 to stay at an idling opening when the output signal is equal to or less than the threshold.

In this manner, the control device 70 holds the opening of the throttle valve 110 constant (idling opening) in the play range, where the friction force that is equal to or larger than a specific level is not generated.

Furthermore, the contact type position sensor shown in FIG. 3 (b) can be adopted as another accelerator position sensor 60'. As shown in FIG. 3(b), with this contact type position sensor 60', the slider 61 moves in the range between A and B where no resistor exists, and the range between B and C where the resistor 63 exists. When the slider 61 is positioned at point B, it is designed to correspond to the ending position of the play range, where the first movable friction member 52 contacts the second movable friction member 53. Consequently, the range between A and B corresponds to the play range of the friction force generating mechanism 50 (accelerator pedal 10), and the range between B and C corresponds to the range where the friction force in excess of the play range is generated. In this case, for example, point A corresponds to a resting position and point C corresponds to a maximum depressing position.

Figure 5:
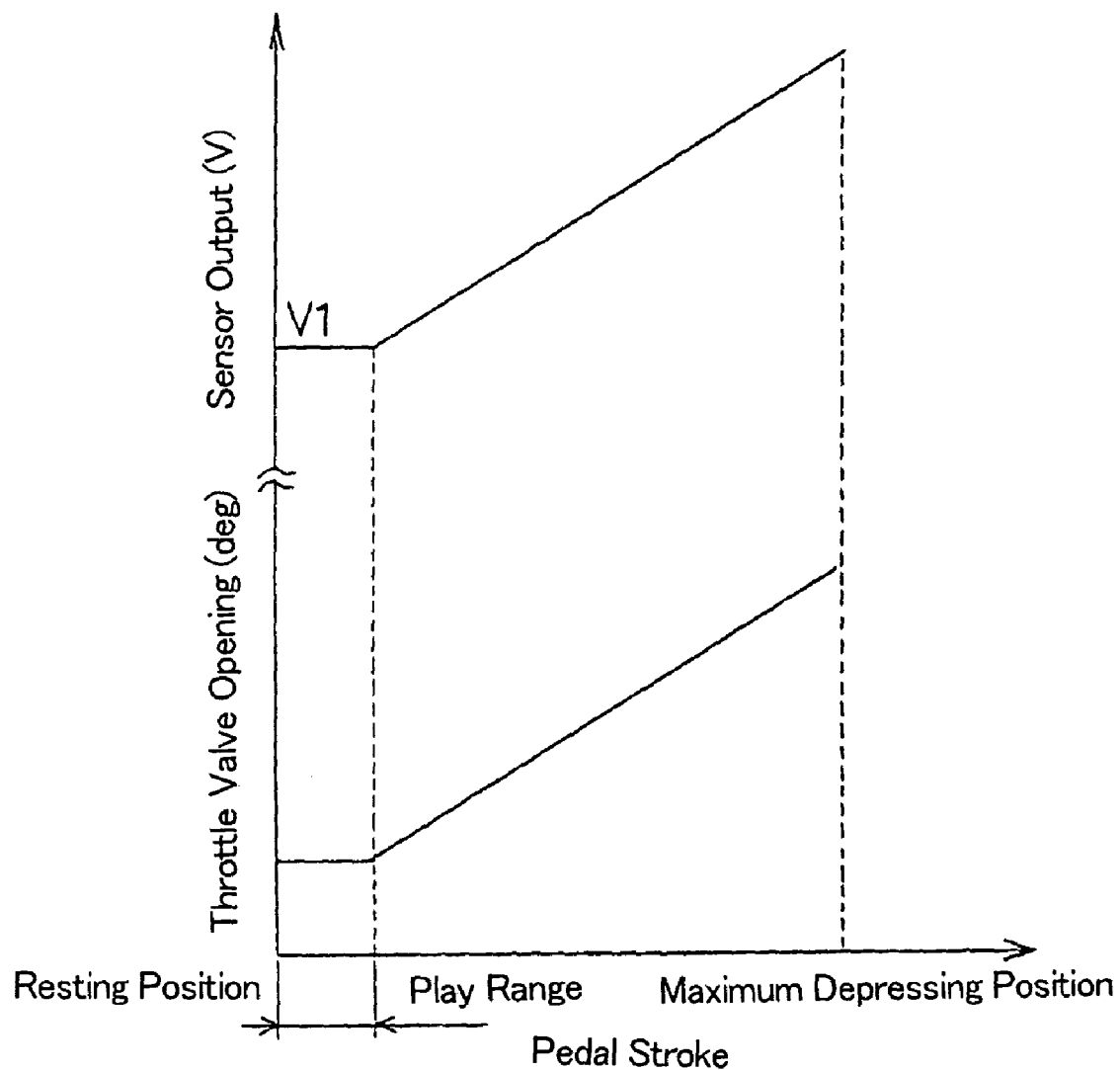
FIG. 5 shows output characteristics of the sensor corresponding to FIG. 2 (*b*).
Figure 6:
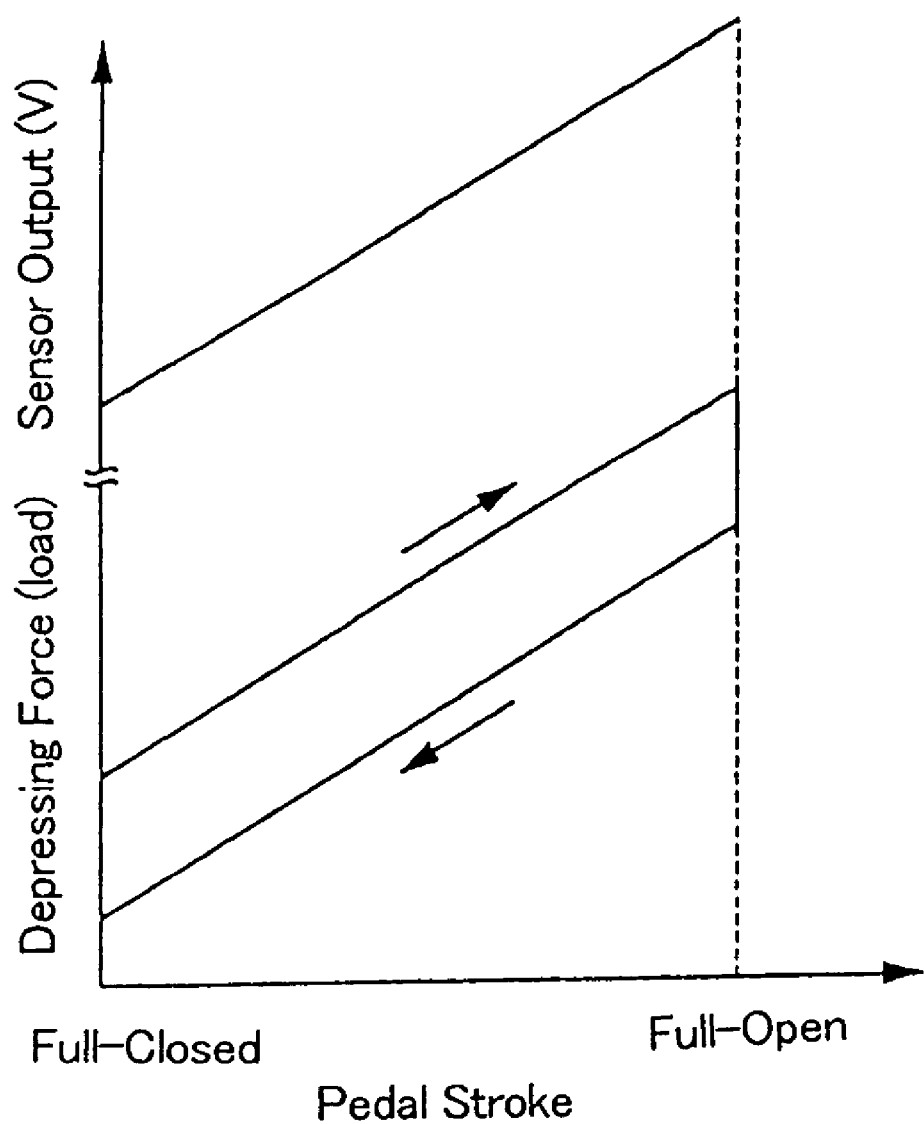
FIG. 6 is a graph showing depressing force characteristics and accelerator position sensor output characteristics of a conventional accelerator pedal apparatus.

Therefore, as shown in FIG. 5, an almost constant voltage signal V1 is output in the play range where the resistance change with sliding is small. In the range over the play range, the output voltage signal increases linearly in accordance with the depressing amount of the accelerator pedal 10. In consequence, even though the accelerator pedal 10 is operated in the play range, the sensor output signal does not change, resulting in that the control segment 70 holds the throttle valve 110 at an idling opening.

In this manner, the control segment 70 holds the opening of the throttle valve 110 constant (idling opening) in the play range, where the friction force that is equal to or larger than a specific level is not generated.

With either accelerator position sensor 60 and 60', when a driver depresses the accelerator pedal 10 from the resting position, it is possible to recognize the position where the increasing characteristic of the depressing force changes caused by the generation of the friction force, namely the ending position of the play range, by the depressing sensation (resistance). The engine power control begins from that position. Hence, an operation without unsuitable feeling is obtained, and the accelerator pedal 10 can be operated safely.

Figure 8:
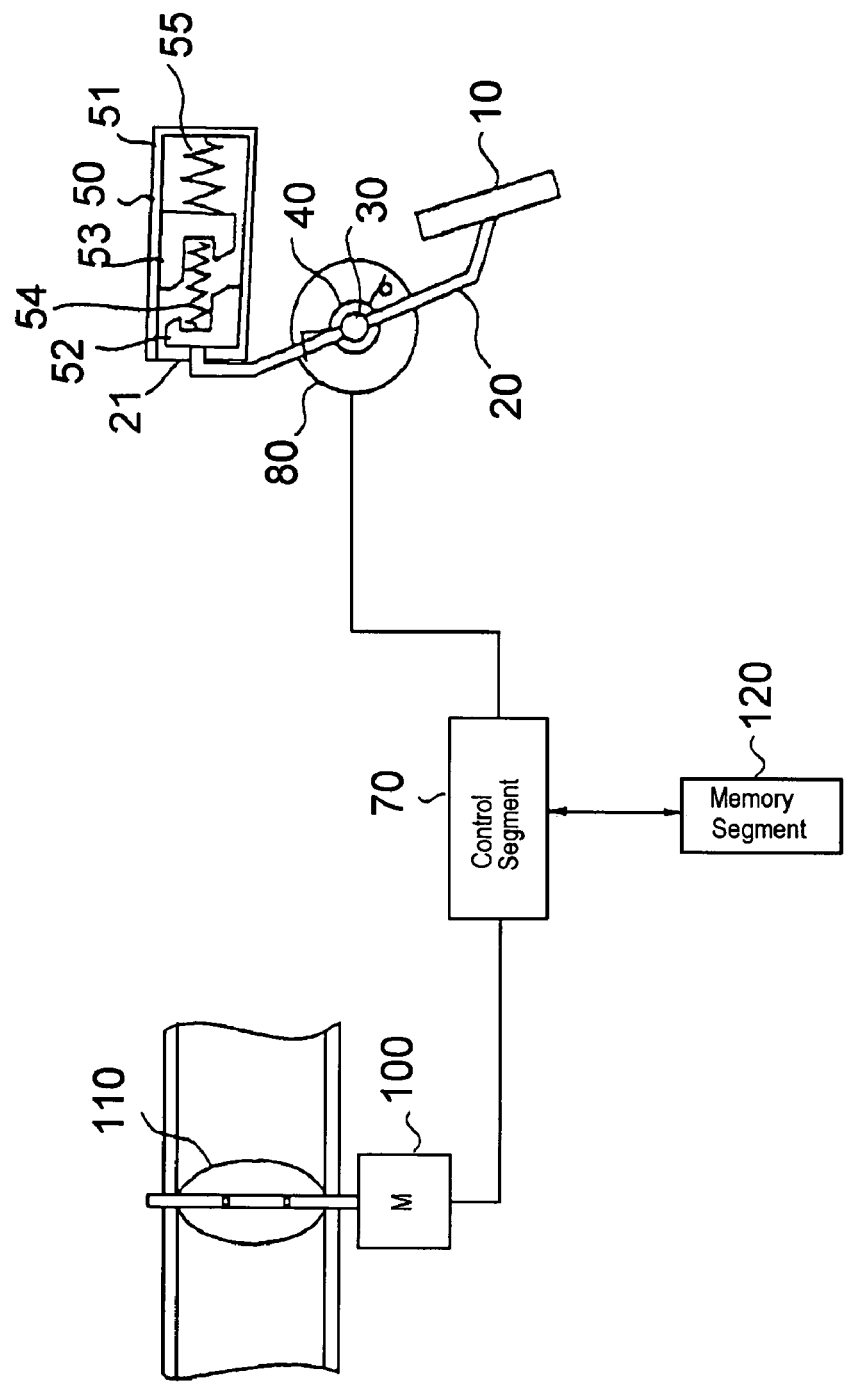
FIG. 8 is a schematic diagram similar to FIG. 1, but showing a non-contact detecting device.

In the abovementioned embodiment, a contact type position sensor has been described as the accelerator position sensor (detecting device) 60, 60'. However, not limited to this type, it is possible to adopt a non-contact type position sensor (detecting device) 80 which outputs position signals by utilizing magnetic flux as shown in FIG. 8. In this case, by utilizing a programmable Hall IC, the output gradient to the magnetic flux is easily set with an external interface.

Specifically, the characteristic of constant output in the play range and that of linear output are possible to obtain. Therefore, similar to the abovementioned embodiment, either a method to control using the control means with a previously set threshold or a method to control using the sensor output signals as they are, can be adopted.

Further, either a rotary type of accelerator position sensor can be used.

Furthermore, in the abovementioned embodiment, the friction force generating mechanism 50 is performed with a linear movement. However, not limited to this, it is possible to generate a friction force with an arc-shaped movable friction member coupled to an arc-shaped sliding surface.

In addition, the play load spring 54 can be disposed between the first movable friction member 52 and the end position 21 of the pedal arm 20. In this case, the play range extends until the end portion 21 of the pedal arm 20 contacts the first movable friction member 52.

INDUSTRIAL APPLICABILITY

With the accelerator pedal apparatus of the present invention, a play range is set to a depressing operation of an accelerator pedal (a pedal arm). In this range, a friction force equal to or larger than a specific level is not generated, and an opening of a throttle valve is kept constant, so that a desirable operating feeling without any unsuitable feeling with the accelerator pedal operation can be obtained.

The invention claimed is:

1. An accelerator pedal apparatus comprising:
    a pedal arm having an accelerator pedal, said pedal arm being operable to move between a resting position and a maximum depressing position due to a force to be applied to said accelerator pedal;
    an arm return spring for applying an urging force to move said pedal arm toward said resting position;
    a detecting device for detecting a position of said pedal arm, and for generating an output signal based on the detected position of said pedal arm;
    a controller for controlling an opening amount of a throttle valve at an engine intake system based on the output signal received from said detecting device; and
    a friction force generating mechanism for generating a force against said pedal arm based on a position of said pedal arm, said friction force generating mechanism including:
        a sliding guide member;
        a first movable friction member arranged in said sliding guide member;
        a second movable friction member arranged in said sliding guide member; and
        a play load spring arranged in said sliding guide member, said play load spring being operable to generate an urging force less than a specified urging force, wherein said pedal arm, said first movable friction member, said second movable friction member, and said play load spring are arranged such that during movement of said pedal arm within a play range extending a specified distance from the resting position toward the maximum depressing position, said play load spring is compressed until said first movable friction member and said second movable friction member contact each other.

2. The apparatus of claim 1, wherein said detecting device comprises a non-contact position sensor for detecting the position of said pedal arm using magnetic flux.

3. The apparatus of claim 2, wherein said play load spring is arranged between said first movable friction member and said second movable friction member.

4. The apparatus of claim 1, wherein said play load spring is arranged between said first movable friction member and said second movable friction member.

5. The apparatus of claim 4, wherein said friction force generating mechanism further includes a friction member return spring arranged inside said sliding guide member, said friction member return spring being operable to generate an urging force greater than or equal to the specified urging force, said friction member return spring being arranged between an inner wall of said sliding guide member and said second movable member, an end of said pedal arm being connected to said first movable friction member.

6. The apparatus of claim 1, wherein said friction force generating mechanism further includes a friction member return spring arranged inside said sliding guide member, said friction member return spring being operable to generate an urging force greater than or equal to the specified urging force.

7. The apparatus of claim 6, wherein said play load spring is arranged to apply the urging force less than the specified urging force between said first movable friction member and said second movable friction member, said friction member return spring being arranged to apply the urging force greater than or equal to the specified urging force between said sliding guide member and said second movable friction member, an end of said pedal arm being connected to said first movable friction member.

8. The apparatus of claim 7, wherein a mid-section of said pedal arm is pivotably attached to a pedal shaft such that said pedal arm is operable to pivot about said pedal shaft, said accelerator pedal being located at a first end of said pedal arm, a second end of said pedal arm opposite said first end being connected to said first movable friction member.

9. The apparatus of claim 1, wherein a mid-section of said pedal arm is pivotably attached to a pedal shaft such that said pedal arm is operable to pivot about said pedal shaft, said accelerator pedal being located at a first end of said pedal arm, a second end of said pedal arm opposite said first end being connected to said friction force generating mechanism.

10. The apparatus of claim 1, further comprising a memory device for storing a threshold pedal arm position corresponding to a position of said pedal arm between the resting position and the maximum depressing position, said control being operable to maintain a constant position of the throttle valve when the position of said pedal arm detected by said detecting device is between the resting position and the threshold pedal arm position.

11. An accelerator pedal apparatus comprising:
    a pedal arm having an accelerator pedal, said pedal arm being operable to move between a resting position and a maximum depressing position due to a force to be applied to said accelerator pedal;
    an arm return spring for applying an urging force to move said pedal arm toward said resting position;
    a detecting device for detecting a position of said pedal arm, and for generating an output signal based on the detected position of said pedal arm, said detecting device comprising a variable resistor including a resistor and a slider operable to move across a slider range including:

a non-contact range portion corresponding to a play range of movement of said pedal arm, wherein said slider does not contact said resistor while in the non-contact range portion; and a contact range portion corresponding to a range of movement of said pedal arm beyond the play range, wherein said slider contacts said resistor while in the contact range portion;

a controller for controlling an opening amount of a throttle valve at an engine intake system based on the output signal received from said detecting device; and a friction force generating mechanism for generating a force against said pedal arm based on a position of said pedal arm, said friction force generating mechanism including:

a sliding guide member;

a first movable friction member arranged in said sliding guide member;

a play load spring arranged in said sliding guide member, said play load spring being operable to generate an urging force less than a specified urging force, wherein said pedal arm, said first movable friction member, said second movable friction member, and said play load spring are arranged such that during movement of said pedal arm within a play range extending a specified distance from the resting position toward the maximum depressing position, said play load spring is compressed by said first movable friction member and said second movable friction member, and said controller is operable to maintain a constant position of the throttle valve when the position of said pedal arm is within the play range.

12. The apparatus of claim 11, wherein said play load spring is arranged between said first movable friction member and said second movable friction member.

13. The apparatus of claim 12, wherein said friction force generating mechanism further includes a friction member return spring arranged inside said sliding guide member, said friction member return spring being operable to generate an urging force greater than or equal to the specified urging force, said friction member return spring being arranged between an inner wall of said sliding guide member and said second movable member, an end of said pedal arm being connected to said first movable friction member.

14. The apparatus of claim 11, wherein said friction force generating mechanism further includes a friction member return spring arranged inside said sliding guide member, said friction member return spring being operable to generate an urging force greater than or equal to the specified urging force.

15. The apparatus of claim 14, wherein said play load spring is arranged to apply the urging force less than the specified urging force between said first movable friction member and said second movable friction member, said friction member return spring being arranged to apply the urging force greater than or equal to the specified urging force between said sliding guide member and said second movable friction member, an end of said pedal arm being connected to said first movable friction member.

16. The apparatus of claim 15, wherein a mid-section of said pedal arm is pivotably attached to a pedal shaft such that said pedal arm is operable to pivot about said pedal shaft, said accelerator pedal being located at a first end of said pedal arm, a second end of said pedal arm opposite said first end being connected to said first movable friction member.

17. The apparatus of claim 11, wherein a mid-section of said pedal arm is pivotably attached to a pedal shaft such that said pedal arm is operable to pivot about said pedal shaft, said accelerator pedal being located at a first end of said pedal arm, a second end of said pedal arm opposite said first end being connected to said friction force generating mechanism.

* * * * *